United States Patent
Heilpern

(10) Patent No.: US 8,903,141 B2
(45) Date of Patent: Dec. 2, 2014

(54) ELECTRONIC DEVICE INCLUDING FINGER SENSOR HAVING ORIENTATION BASED AUTHENTICATION AND RELATED METHODS

(75) Inventor: Mark Allen Heilpern, Satellite Beach, FL (US)

(73) Assignee: Authentec, Inc., Melbourne, FL (US)

( * ) Notice: Subject to any disclaimer, the term of this patent is extended or adjusted under 35 U.S.C. 154(b) by 265 days.

(21) Appl. No.: 13/463,251

(22) Filed: May 3, 2012

(65) Prior Publication Data

US 2013/0294660 A1 Nov. 7, 2013

(51) Int. Cl.
G06K 9/00 (2006.01)
G06K 9/32 (2006.01)

(52) U.S. Cl.
USPC ............ 382/124; 382/115; 382/125; 382/296

(58) Field of Classification Search
None
See application file for complete search history.

(56) References Cited

U.S. PATENT DOCUMENTS

| | | | |
|---|---|---|---|
| 5,953,441 A | 9/1999 | Setlak | |
| 6,289,114 B1 | 9/2001 | Mainguet | |
| 6,927,581 B2 | 8/2005 | Gozzini | |
| 7,361,919 B2 | 4/2008 | Setlak | |
| 7,590,269 B2 * | 9/2009 | Creasey et al. | 382/124 |
| 7,697,281 B2 | 4/2010 | Dabov et al. | |
| 7,715,593 B1 | 5/2010 | Adams et al. | |
| 7,734,068 B2 | 6/2010 | Fisher | |
| 7,809,168 B2 | 10/2010 | Abiko et al. | |
| 8,145,916 B2 | 3/2012 | Boshra et al. | |
| 2003/0214692 A1 | 11/2003 | Carver | |
| 2005/0169503 A1 | 8/2005 | Howell et al. | |
| 2008/0113685 A1 | 5/2008 | Ishida et al. | |
| 2009/0083847 A1 | 3/2009 | Fadell et al. | |
| 2009/0083850 A1 | 3/2009 | Fadell et al. | |
| 2009/0201257 A1 | 8/2009 | Saitoh et al. | |
| 2009/0226052 A1 | 9/2009 | Fedele et al. | |
| 2010/0082444 A1 | 4/2010 | Lin et al. | |
| 2010/0321158 A1 | 12/2010 | Setlak et al. | |
| 2011/0175703 A1 | 7/2011 | Benkley, III | |
| 2012/0268246 A1 * | 10/2012 | Liu | 340/5.82 |

FOREIGN PATENT DOCUMENTS

EP 1645989 4/2006

* cited by examiner

Primary Examiner — Matthew Bella
Assistant Examiner — Jose M Torres
(74) Attorney, Agent, or Firm — Allen, Dyer, Doppelt, Milbrath & Gilchrist, P.A.

(57) ABSTRACT

An electronic device may include a housing, and a finger sensor carried by the housing to sense a user's finger placement at different rotational angles. The electronic device may also include an orientation sensor carried by the housing to sense an orientation thereof, and a processor coupled to the finger sensor and the orientation sensor. The processor may acquire finger-matching biometric data of the user's finger at an unknown rotational angle relative to a known rotational angle of finger-enrollment data, generate an estimated rotational angle of the acquired finger-matching biometric data and based upon a sensed orientation of the housing, and attempt an authentication of the user based upon the estimated acquired rotational angle.

25 Claims, 4 Drawing Sheets

ELECTRONIC DEVICE INCLUDING FINGER SENSOR HAVING ORIENTATION BASED AUTHENTICATION AND RELATED METHODS

FIELD OF THE INVENTION

The present invention relates to the field of electronics, and, more particularly, to the field of finger sensors.

BACKGROUND OF THE INVENTION

Fingerprint sensing and matching is a reliable and widely used technique for personal identification or verification. In particular, a common approach to fingerprint identification involves scanning a sample fingerprint or an image thereof and storing the image and/or unique characteristics of the fingerprint image. The characteristics of a sample fingerprint may be compared to information for reference fingerprints already in a database to determine proper identification of a person, such as for verification purposes.

A particularly advantageous approach to fingerprint sensing is disclosed in U.S. Pat. No. 5,953,441 to Setlak and assigned to the assignee of the present invention, the entire contents of which are herein incorporated by reference. The fingerprint sensor is an integrated circuit sensor that drives the user's finger with an electric field signal and senses the electric field with an array of electric field sensing pixels on the integrated circuit substrate.

U.S. Pat. No. 6,289,114 to Mainguet, which is assigned to the assignee of the present invention and is incorporated in its entirety by reference, discloses a fingerprint sensor that includes a finger sensing integrated circuit (IC). The finger sensing IC includes a layer of piezoelectric or pyroelectric material placed between upper and lower electrodes to provide electric signals representative of an image of the ridges and valleys of the fingerprint.

A particularly advantageous approach to multi-biometric fingerprint sensing is disclosed in U.S. Pat. No. 7,361,919 to Setlak, which is assigned to the assignee of the present invention and is incorporated in its entirety by reference. The Setlak patent discloses a multi-biometric finger sensor sensing different biometric characteristics of a user's finger that have different matching selectivities.

A fingerprint sensor may be particularly advantageous for verification and/or authentication in an electronic device, and more particularly, a portable device, for example. Such a fingerprint sensor may be carried by the housing of a portable electronic device, for example, and may be sized to sense a fingerprint from a single-finger. For example, the AES3400 sensor from AuthenTec, Inc. of Melbourne, Fla., the assignee of the present invention, is widely used in a variety of notebooks, desktops and PC peripherals. Other fingerprint sensors, for example, the AES850, also from AuthenTec, Inc. of Melbourne, Fla., is a multi-function smart sensor that expands touch-based functionality of touchscreen and QWERTY smartphones with a reduced impact on sensor performance or durability. Thus, a fingerprint sensor may be particularly advantageous for providing more convenient access to the electronic device without a password, for example, and, more particularly, without having to type the password, which is often time consuming. A fingerprint sensor may also be particularly advantageous for starting one or more applications on the electronic device.

U.S. Patent Application Publication No. 2011/0175703 to Benkley, III discloses an electronic imager using an impedance sensor grid array mounted on or about a switch. More particularly, Benkley, III discloses a switch being incorporated into a sensor assembly that allows integration of sensor operations, such as, fingerprint sensor operations. A fingerprint sensor can be used for authentication while being used together with a power switch or navigation selection switch. The authentication may be used to access the device entirely or access different levels of information.

U.S. Patent Application Publication No. 2009/0083850 to Fadell et al. discloses an embedded authentication system in an electronic device. More particularly, Fadell et al. discloses authenticating a user via a fingerprint to provide access to resources or content that was previously not available. The electronic device may allow a user to authenticate for a particular amount of time for accessing restricted resources.

U.S. Pat. No. 7,809,168 to Abiko et al. discloses a biometric information input device. More particularly, Abiko et al. discloses a movement direction detection means for detecting a movement direction of a finger with respect to the fingerprint sensor, based on partial fingerprint images collected by the fingerprint sensor.

There may be applications for finger biometric sensors on electronic devices where the user may place his finger at different rotational angles so that finger-matching biometric data is acquired at an unknown angle relative to finger-enrollment biometric data. Since the finger-enrollment biometric data is typically stored at a known or predetermined angle, typical matching schemes employ a trial an error approach to attempt authentication of a user by assuming different rotational angles of the acquired finger-matching biometric data.

SUMMARY OF THE INVENTION

In view of the foregoing background, it is therefore an object of the present invention to provide security while providing convenience.

This and other objects, features, and advantages in accordance with the present invention are provided by an electronic device that may include a housing, and a finger sensor carried by the housing to sense a user's finger placement at different rotational angles. The electronic device may also include an orientation sensor carried by the housing to sense an orientation thereof, and a processor coupled to the finger sensor and the orientation sensor, for example. The processor may acquire finger-matching biometric data of the user's finger at an unknown rotational angle relative to a known rotational angle of finger-enrollment data, generate an estimated rotational angle of the acquired finger-matching biometric data and based upon a sensed orientation of the housing, and attempt an authentication of the user based upon the estimated acquired rotational angle. Accordingly, the electronic device advantageously provides increased security while providing more convenient access thereto. For example, the electronic device may be particularly advantageous for more quickly authenticating a user when the electronic device is usable and may be held in multiple orientations.

The processor, upon a failed authentication attempt, may generate at least one other estimated rotational angle of the acquired finger-matching biometric data based upon the sensed orientation of the housing, for example. The processor, upon the failed authentication attempt may further attempt at least one other authentication of the user based upon the at least one other estimated rotational angle. The at least one other estimated rotational angle may be less than or equal to 45 degrees from the estimated rotational angle, for example.

The electronic device may further include a finger-operated input device carrying the finger sensor, for example. The processor may perform at least one device function responsive to operation of the finger-operated input device, for example. The processor may acquire the finger-matching biometric data from the finger sensor also responsive to operation of the finger-operated input device. The finger-operated input device may include a pushbutton switch.

The processor may also acquire the finger-enrollment biometric data, and may perform the attempted authentication based upon matching the acquired finger-matching biometric data with the finger-enrollment biometric data. The orientation sensor may include an accelerometer, for example. The electronic device may further include wireless communications circuitry coupled to the processor and may perform at least one wireless communications function.

A method aspect is directed to a method of authenticating a user of an electronic device that may include a housing, a finger sensor carried by the housing to sense a user's finger placement at different rotational angles, an orientation sensor carried by the housing to sense an orientation thereof, and a processor coupled to the finger sensor and the orientation sensor. The method may include using the processor to acquire finger-matching biometric data of the user's finger at an unknown rotational angle relative to a known rotational angle of finger-enrollment data, generate an estimated rotational angle of the acquired finger-matching biometric data and based upon a sensed orientation of the housing, and attempt an authentication of the user based upon the estimated acquired rotational angle.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout and prime notation is used to indicate similar elements in alternative embodiments.

Figure 1:
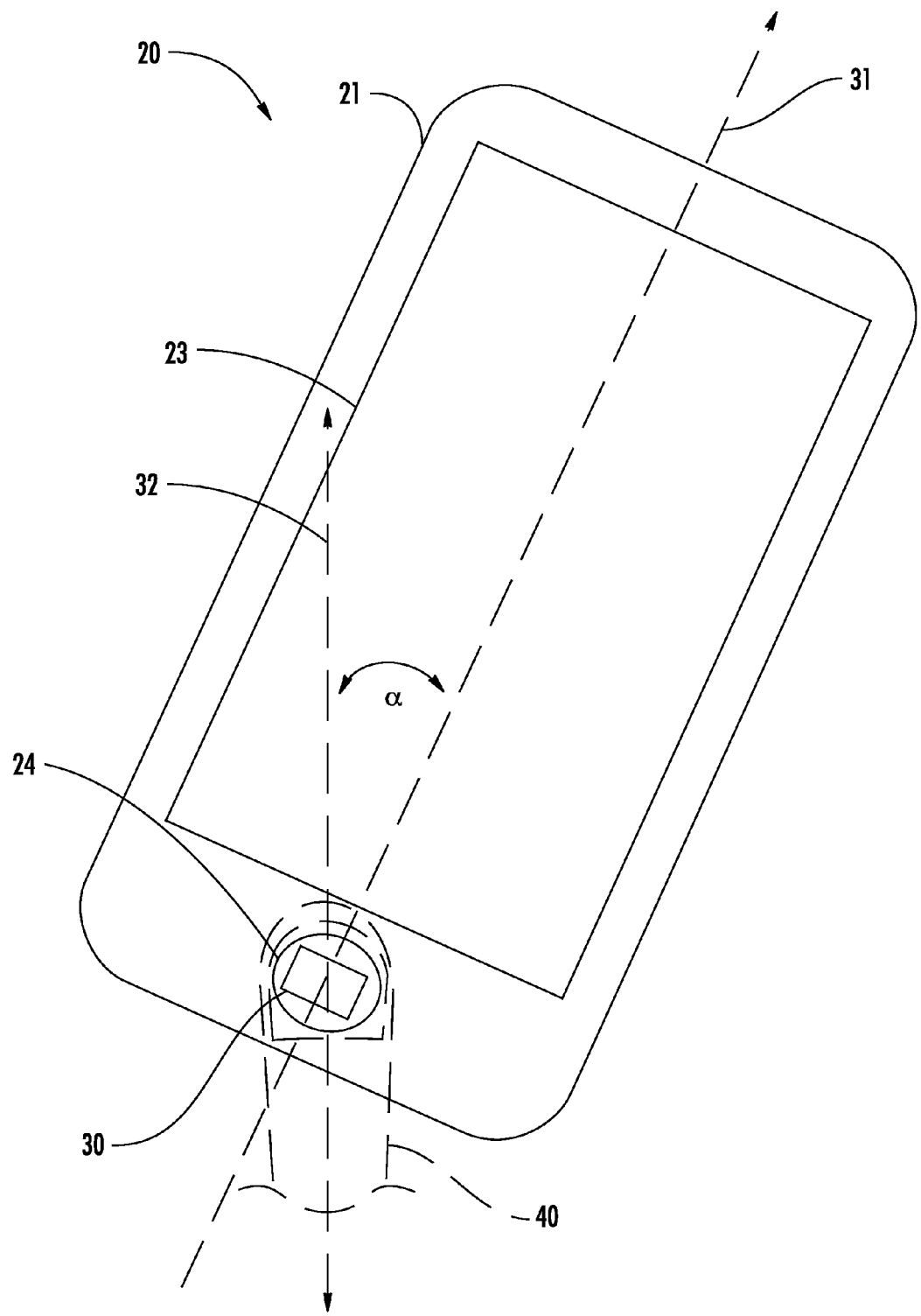
FIG. 1 is a plan view of an electronic device according to the present invention.
Figure 2:
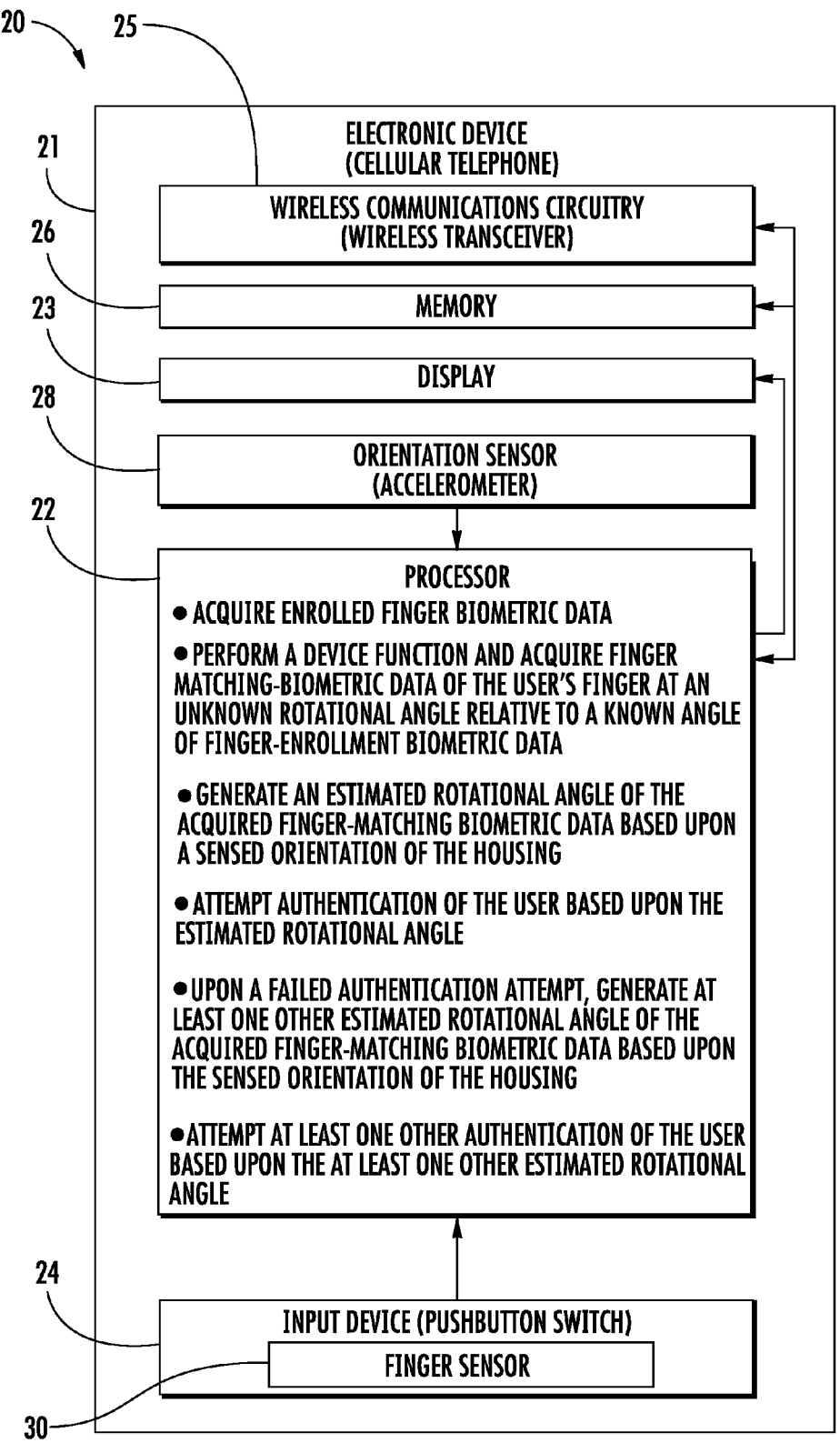
FIG. 2 is a schematic block diagram of the electronic device of FIG. 1.

Referring initially to FIGS. 1 and 2, an electronic device 20 is now described. The electronic device 20 illustratively includes a portable housing 21 and a processor 22 carried by the portable housing. The electronic device 20 is illustratively a mobile wireless communications device, for example, a cellular telephone or smartphone. The electronic device 20 may be another type of electronic device, for example, a tablet computer, laptop computer, etc.

A wireless transceiver 25 is also carried within the portable housing 21 and is coupled to the processor 22. The wireless transceiver 25 cooperates with the processor 22 to perform at least one wireless communications function, for example, for voice and/or data communication. In some embodiments, the electronic device 20 may not include a wireless transceiver 25 or other wireless communications circuitry.

A display 23 is also carried by the portable housing 21 and is coupled to the processor 22. The display 23 may be a liquid crystal display (LCD), for example, or may be another type of display, as will be appreciated by those skilled in the art.

An orientation sensor 28 is also carried by the portable housing 21 and is coupled to the processor 22. The orientation sensor 28 senses an orientation of the portable housing 21. More particularly, the orientation sensor 28 may sense that the portable housing 21 is being held at an angle with respect a reference, for example, vertical from the ground, and may cooperate with the processor 22 and the display 23 to display in a landscape or portrait mode, for example. The orientation sensor 28 may cooperate with the processor 22 to perform other or additional functions, as will be described in further detail below. The orientation sensor 28 may be an accelerometer, for example. Of course, the orientation sensor 28 may be another type of orientation sensing device.

A finger-operated input device, illustratively in the form of a pushbutton switch 24, is also carried by the portable housing 21 and is coupled to the processor 22. The pushbutton switch 24 cooperates with the processor 22 to perform one or more device functions in response to operation of the pushbutton switch. For example, a device function may include a powering on or off of the electronic device 20, initiating communication via the wireless communications circuitry 25, and/or performing a menu function.

More particularly, with respect to a menu function, the processor 22 may change the display 23 to show a menu of available applications based upon pressing of the pushbutton switch 24. In other words, the pushbutton switch 24 may be a home switch or button, or key. The processor 22 may also toggle between applications executed by the processor based upon pressing of the pushbutton switch 24. Of course, other device functions may be performed based upon the pushbutton switch 24. In some embodiments, the finger-operated input device 24 may be a different type of finger-operated input device, for example, forming part of a touch screen display. Other or additional finger-operated input devices may be carried by the portable housing 21.

A finger sensor 30 is carried by the pushbutton switch 24 to sense a user's finger 40. The finger sensor 30 is carried by the pushbutton switch 24 so that when a user contacts and/or presses downward on the pushbutton switch, finger biometric data from the user's finger 40 is acquired, for example, for finger matching and/or finger enrollment to be stored and later used for matching.

The finger biometric data may include fingerprint minutae data, ridge and/or valley fingerprint image data, ridge flow data, finger pore data, etc. For example, the finger sensor 30 may be a finger sensor as described in U.S. Pat. No. 5,953,441 to Setlak and/or as described in U.S. Pat. No. 6,927,581 to Gozzini, and assigned to the assignee of the present invention and the entire contents of which are herein incorporated by reference.

Figure 3:
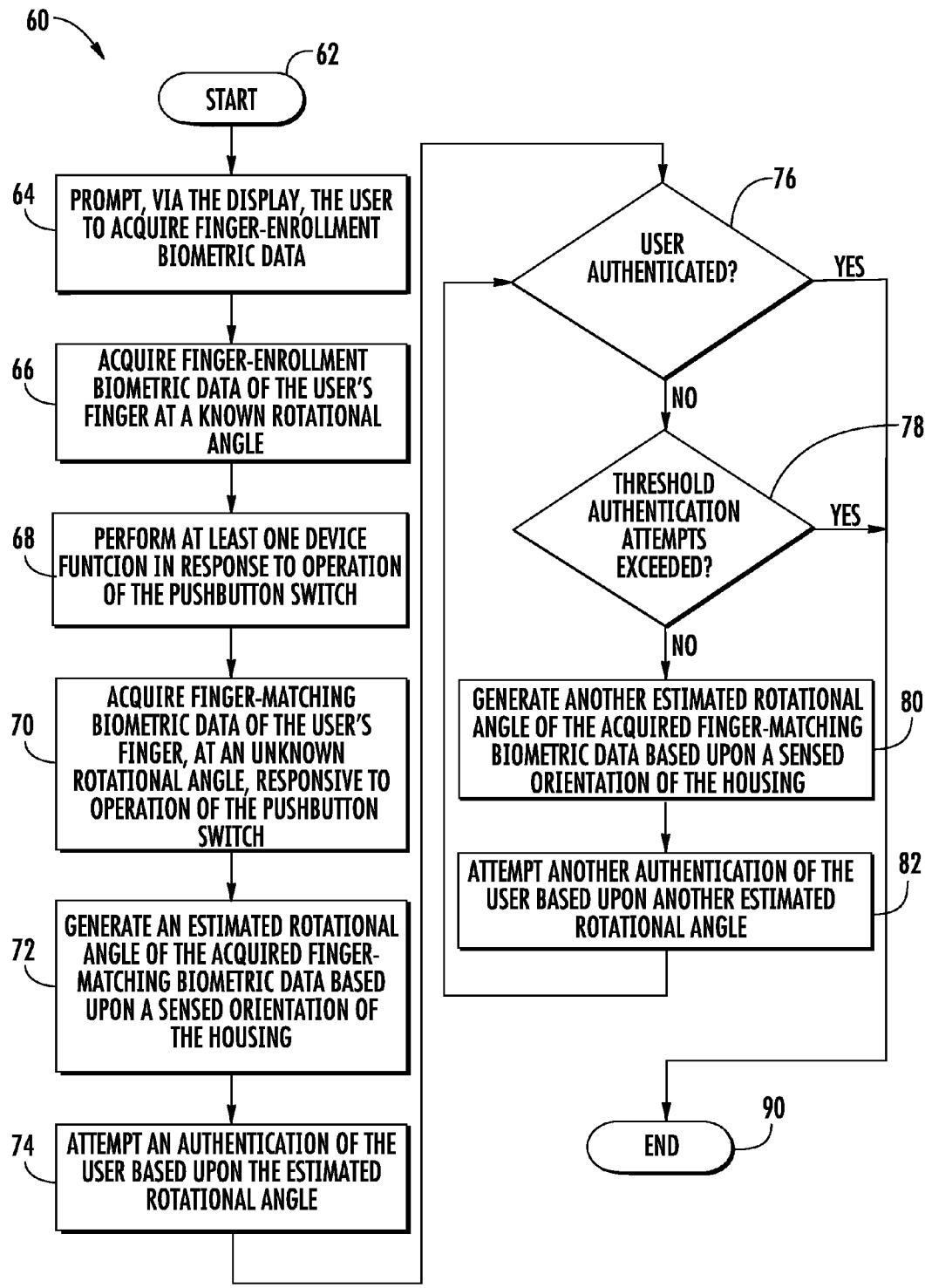
FIG. 3 is a flow chart of a method of authenticating a user according to the present invention.

Referring now additionally to the flowchart 60 of FIG. 3, further details of operation of the electronic device 20 are now described. Beginning at Block 62, the processor 22 may prompt the user, via the display 23, to acquire the finger-enrollment biometric data (Block 66) and store the finger-enrollment biometric data in memory 26 coupled to the processor. More particularly, the processor 22 may prompt the user to start enrollment of finger-enrollment data (Block 64). This may occur, for example, upon an initial setup of the electronic device 20. Finger-enrollment biometric data may be acquired, for example, responsive to operation of the pushbutton switch 24 or by contact with the finger sensor 30, as will be appreciated by those skilled in the art. In some embodiments, the processor 22 may acquire additional finger-enrollment biometric data based upon input from the user or based upon a prompt, for example, if the user wishes to enroll finger-enrollment biometric data associated with another finger, or add finger-enrollment biometric data of another authorized user's finger.

In some embodiments, the processor 22 cooperates with the pushbutton switch 24 to perform a device function in response to the pushbutton switch. The processor 22 may acquire finger-enrollment biometric data of the user's finger from the finger sensor 30 responsive to each of the operations of the pushbutton switch 24. In other words, each time the user presses the pushbutton switch 24, the processor 22 may acquire finger-enrollment biometric data 26. From the perspective of the user, the acquisition of the finger-enrollment biometric data may be transparent. In particular, the finger-enrollment biometric data may be acquired during normal operation of the pushbutton switch 24 while performing device functions. Also, finger-enrollment biometric data may be enrolled according to other techniques, which may be responsive to each operation of the pushbutton switch 24, as will be appreciated by those skilled in the art. Other or additional enrollment techniques may be performed by the processor 22. The finger-enrollment biometric data is acquired with the user's finger 40 at a known angle relative to the housing 21 and finger sensor 30. For example, the enrollment data may be acquired with the axis 32 of the user's finger 40 aligned with the longitudinal axis 31 of the housing 21 of the device 20.

After the finger-enrollment biometric data has been enrolled, the processor 22 cooperates with the pushbutton switch 24 to perform a device function, as noted above, in response to the pushbutton switch (Block 68). The processor 22 may acquire finger-matching biometric data of the user's finger 40 from the finger sensor 30 responsive to operation of the pushbutton switch 24 (Block 70). For example, the processor 22 may acquire finger-matching biometric data from the user's finger 40 from the finger sensor 30 when the user presses the pushbutton switch 24, based upon a prompt from an application, or to exit an application and return to a main menu. It should be understood that in some embodiments, the pushbutton switch 24 may not be operated to acquire finger-matching biometric data. For example, finger-matching biometric data may be acquired based upon just placement of the user's finger 40 on the finger sensor 30.

The finger-matching biometric data is acquired at an unknown rotational angle α, from among a plurality of possible rotational angles and relative to the finger-enrollment biometric data. For example, the portable housing 21 may typically be held by the user in an upright or portrait orientation, so that a longitudinal axis 32 of the user's finger 40 positioned on the pushbutton switch 24 is aligned with the longitudinal axis 31 of the portable housing during collection of the finger-enrollment biometric data. However, the user may not always place his finger 40 of the sensor 30 at this aligned orientation.

The processor 22 generates an estimated rotational angle of the acquired finger-matching biometric data based upon a sensed orientation of the portable housing 21 (Block 72). More particularly, the processor 22 in cooperation with the orientation sensor 28 senses an orientation of the portable housing 21. As shown in FIG. 1, a sensed orientation of the housing 21 is rotated at an angle α of about 45 degrees clockwise from vertical, and, in this instance, the processor 22 determines that the user's finger 40 is likely to be positioned vertically so that the estimated rotational angle of the acquired finger-matching biometric data is 45 degrees counterclockwise from the known finger-enrollment biometric data.

The processor 22 attempts authentication of the user based upon matching of the acquired finger-matching biometric data at a first estimated rotational angle relative to finger-enrollment biometric data at the known rotational angle (Block 74). In the instance illustrated in FIG. 1, the user's finger 40 is indeed positioned vertically, and, taking into account the housing 21 is rotated clockwise 45 degrees, the matching data may be rotated 45 degrees in the clockwise direction so that the processor's first attempt at matching the acquired finger-matching biometric data to the enrolled biometric data produces a match.

If the authentication attempt fails (Block 76), the processor 22 generates another or second estimated rotational angle of the acquired finger-matching biometric data based upon the sensed orientation of the portable housing 21 (Block 80). The second estimated rotational angle may be less than or equal to 90-degrees from the first estimated rotational angle. More particularly, the processor 22 may "rotate" the finger-matching biometric data in an increment of 45-degrees. Forty-five degrees may be particularly advantageous when the processor 22 is able to match sensed finger-matching biometric data to finger-enrollment biometric data to within ±45 degrees. Of course, other increments or other estimated rotational angles may be generated, which may be based upon the type of characteristic of the finger sensor 30 and processor 22 as will be appreciated by those skilled in the art.

The processor 22 again attempts another authentication based upon matching of the acquired finger-matching biometric data at the other or newly estimated rotational angle to the finger-enrollment biometric data at the predetermined angle (Block 82). If the user is authenticated by way of a match, the method ends at Block 90.

If, however, the authentication again fails (Block 76), the processor 22 generates yet another estimated rotational angle (Block 80) and attempts authentication of the user based upon matching of the acquired finger-matching biometric data at the other or newly estimated rotational angle to the finger-enrollment biometric data at the predetermined angle (Block 82). If the user is authenticated, the method ends at Block 90.

The processor 22 may continue generating additional estimated rotational angles (Block 80) and attempting authentication (Block 82) based upon the additional estimated rotational angles until there is a match, or for a threshold number of authentication attempts (Block 78) if there is no match. If the threshold number of additional estimated rotational angles has been generated and matching has been attempted, the method ends at Block 90. For example, if, as noted above, the finger sensor 30 has a matching threshold of ±45 degrees, the threshold may be set to a total of eight authentication attempts. As will be appreciated by those skilled in the art, if the user is not authenticated, in some embodiments, for example, the processor 22 may lock out the electronic device 20 by locking out input received from the pushbutton switch 24. In other embodiments, the processor 22 may prompt the user, via the display 23, for enrollment of other and/or additional finger-enrollment biometric data.

As will also be appreciated by those skilled in the art, the generation of an estimated rotational angle of the acquired finger-matching biometric data based upon the sensed orientation of the portable housing 21 may advantageously reduce processing time, for example, the processing time for authenticating a user. This may also facilitate matching, when a user may have multiple fingers enrolled, and with each finger to provide a different function, for example.

Prior art finger matching techniques attempt a user authentication via a match without consideration of a rotational angle of the acquired finger-matching biometric data. If the authentication fails, the finger-matching biometric data is rotated and another match is attempted. In accordance with the present invention, the processor 22 advantageously generates an estimated rotational angle based upon the orientation of the housing 21, and prior to attempting authentication. This advantageously may reduce the number of authentication attempts or match attempts, which may increase the speed of the user authentication, and may reduce power consumption, which may be particularly advantageous in a mobile device, such as, for example, a cellular telephone or smartphone.

Figure 4:
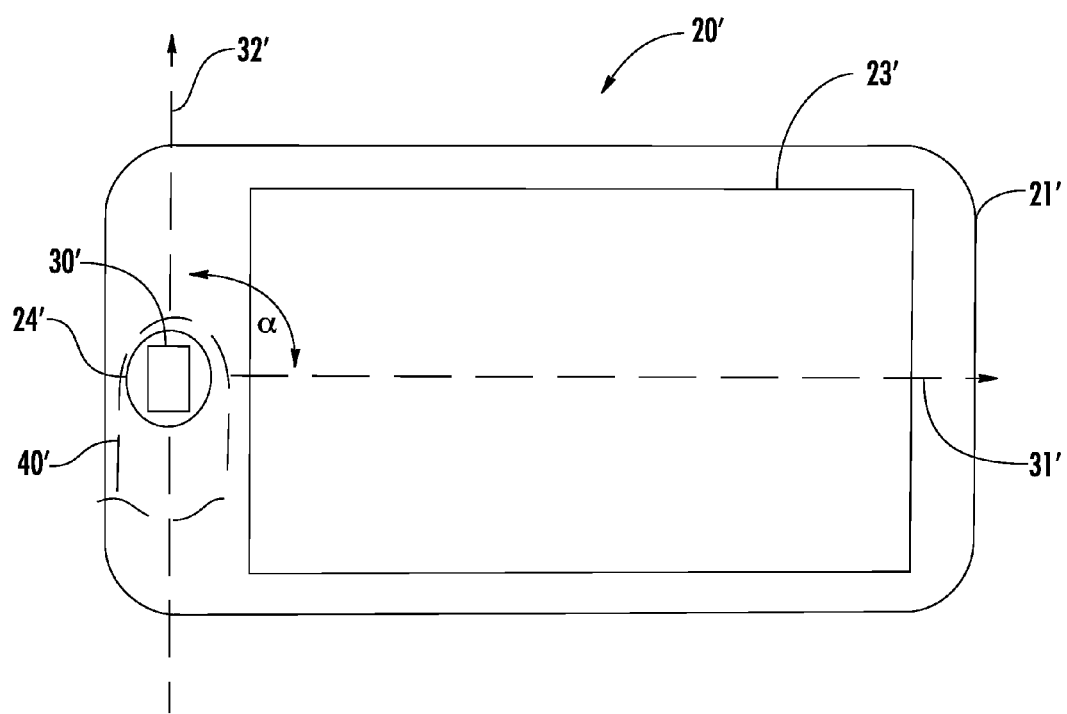
FIG. 4 is a plan view of the electronic device at a different rotational angle according to the present invention.

Referring now additionally to FIG. 4, another example is illustrated wherein the sensed rotational angle α' is 90 degrees in the clockwise direction. In other words, in this instance the electronic device 20' is rotated clockwise to the landscape mode. The processor 22' may generate an estimated rotational angle to align the acquired finger-matching biometric data with the rotational angle associated with the finger-enrollment biometric data.

It should be understood that while the embodiments described may be particularly useful for both enrollment and matching operations, the matching operations may be performed independently of the enrollment operations, and vice versa. In addition, many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An electronic device comprising:
   a housing;
   a finger sensor carried by said housing to sense a user's finger placement at different rotational angles;
   an orientation sensor carried by said housing to sense an orientation thereof; and
   a processor coupled to said finger sensor and said orientation sensor to
      acquire finger-matching biometric data of the user's finger at an unknown rotational angle relative to a known rotational angle of finger-enrollment data,
      generate an estimated rotational angle of the acquired finger-matching biometric data and based upon a sensed orientation of said housing, and
      attempt an authentication of the user based upon the estimated rotational angle.

2. The electronic device of claim 1, wherein said processor, upon a failed authentication attempt, is to generate at least one other estimated rotational angle of the acquired finger-matching biometric data based upon the sensed orientation of said housing, and attempt at least one other authentication of the user based upon the at least one other estimated rotational angle.

3. The electronic device of claim 2, wherein the at least one other estimated rotational angle is less than or equal to 45 degrees from the estimated rotational angle.

4. The electronic device of claim 1, further comprising a finger-operated input device carrying said finger sensor; wherein said processor is to perform at least one device function responsive to operation of said finger-operated input device, and to acquire the finger-matching biometric data from said finger sensor also responsive to operation of said finger-operated input device.

5. The electronic device of claim 4, wherein said finger-operated input device comprises a pushbutton switch.

6. The electronic device of claim 1, wherein said processor is to also acquire the finger-enrollment biometric data.

7. The electronic device of claim 1, wherein said processor is to also attempt the authentication of the user based upon matching of the acquired finger-matching biometric data and the finger-enrollment biometric data.

8. The electronic device of claim 1, wherein said orientation sensor comprises an accelerometer.

9. The electronic device of claim 1, further comprising wireless communications circuitry carried by said housing and coupled to said processor and to perform at least one wireless communications function.

10. An electronic device comprising:
    a housing;
    a finger sensor carried by said housing to sense a user's finger placement at different rotational angles;
    an accelerometer carried by said housing to sense an orientation thereof;
    wireless communications circuitry to perform at least one wireless communications function; and
    a processor coupled to said finger sensor, said accelerometer, and said wireless communications circuitry to
       acquire finger-matching biometric data of the user's finger at an unknown rotational angle relative to a known rotational angle of finger-enrollment data,
       generate an estimated rotational angle of the acquired finger-matching biometric data and based upon a sensed orientation of said housing, and
       attempt an authentication of the user based upon the estimated rotational angle.

11. The electronic device of claim 10, wherein said processor, upon a failed authentication attempt, is to generate at least one other estimated rotational angle of the acquired finger-matching biometric data based upon the sensed orientation of said housing, and attempt at least one other authentication of the user based upon the at least one other estimated rotational angle.

12. The electronic device of claim 11, wherein the at least one other estimated rotational angle is less than or equal to 45 degrees from the estimated rotational angle.

13. The electronic device of claim 10, further comprising a finger-operated input device carrying said finger sensor; wherein said processor is to perform at least one device function responsive to operation of said finger-operated input device, and to acquire the finger-matching biometric data from said finger sensor also responsive to operation of said finger-operated input device.

14. The electronic device of claim 13, wherein said finger-operated input device comprises a pushbutton switch.

15. The electronic device of claim 10, wherein said processor is to also acquire the finger-enrollment biometric data.

16. The electronic device of claim 10, wherein said processor is to also attempt the authentication of the user based upon matching of the acquired finger-matching biometric data and the finger-enrollment biometric data.

17. A method of authenticating a user of an electronic device comprising a housing, a finger sensor carried by the housing to sense a user's finger placement at different rotational angles, an orientation sensor carried by the housing to sense an orientation thereof, and a processor coupled to the finger sensor and the orientation sensor, the method comprising:

using the processor to
acquire finger-matching biometric data of the user's finger at an unknown rotational angle relative to a known rotational angle of finger-enrollment data,
generate an estimated rotational angle of the acquired finger-matching biometric data and based upon a sensed orientation of said housing, and
attempt an authentication of the user based upon the estimated rotational angle.

18. The method of claim 17, further comprising using the processor, upon a failed authentication attempt, to generate at least one other estimated rotational angle of the acquired finger-matching biometric data based upon the sensed orientation of the housing, and attempt at least one other authentication of the user based upon the at least one other estimated rotational angle.

19. The method of claim 18, wherein the at least one other estimated rotational angle is less than or equal to 45 degrees from the estimated rotational angle.

20. The method of claim 17, further comprising using the processor to perform at least one device function responsive to operation of a finger-operated input device carrying the finger sensor, and to acquire the finger-matching biometric data from the finger sensor also responsive to operation of the finger-operated input device.

21. The method of claim 20, wherein the finger-operated input device comprises a pushbutton switch.

22. The method of claim 17, further comprising using the processor to also acquire the finger-enrollment biometric data.

23. The method of claim 17, further comprising using the processor to also attempt the authentication of the user based upon matching of the acquired finger-matching biometric data and the finger-enrollment biometric data.

24. The method of claim 17, wherein the orientation sensor comprises an accelerometer.

25. The method of claim 17, further comprising using wireless communications circuitry coupled to the processor to perform at least one wireless communications function.

\* \* \* \* \*